(12) United States Patent
Takemura

(10) Patent No.: US 6,697,615 B1
(45) Date of Patent: Feb. 24, 2004

(54) COMMUNICATION QUALITY DATA GATHERING APPARATUS AND DATA PROCESSING METHOD THEREFOR

(75) Inventor: Daigo Takemura, Osaka (JP)

(73) Assignee: Motorola, Inc., Schaumburg, IL (US)

( * ) Notice: Subject to any disclaimer, the term of this patent is extended or adjusted under 35 U.S.C. 154(b) by 395 days.

(21) Appl. No.: 09/679,905

(22) Filed: Oct. 5, 2000

(30) Foreign Application Priority Data

Oct. 8, 1999 (JP) .......................................... 11-288063

(51) Int. Cl.[7] ................................................ H04Q 7/20
(52) U.S. Cl. ...................... 455/423; 455/67.1; 455/456; 455/457
(58) Field of Search ........................... 455/67.11, 67.13, 455/67.7, 423, 424, 425, 456.1, 456.3, 456.6, 457; 370/241, 246, 234, 252, 253; 342/357.01, 357.06, 357.1, 357.12–357.13

(56) References Cited

U.S. PATENT DOCUMENTS 6,026,303 A * 2/2000 Minamisawa ................ 455/446
6,078,818 A * 6/2000 Kingdon et al. ............ 455/456

* cited by examiner

Primary Examiner—Lee Nguyen

(57) ABSTRACT

Communication quality measured between a base station and a mobile station in a radiotelephone system is associated with positional information at a point where such measurement is made. A radio communication link is established between a mobile station, i.e., a data gathering apparatus 10, and a base station 11, and data is transferred therebetween at a predetermined transmission rate to determine the maximum transmission rate. If the transmission is done correctly, the positional information is determined at that point. The positional information is obtained by use of a GPS receiver 18, which receives signals sent from satellites 16 orbiting around the earth. The resulting positional information is associated with the transmission rate and stored in a memory 20, or displayed on a display unit 22.

16 Claims, 3 Drawing Sheets

COMMUNICATION QUALITY DATA GATHERING APPARATUS AND DATA PROCESSING METHOD THEREFOR

FIELD OF THE INVENTION

The present invention relates to apparatus and methods for gathering communication quality data in a radiotelephone system, and, more specifically, to an apparatus and method for storing and displaying transmission rate data and positional information where the data is gathered, as associated therebetween.

BACKGROUND OF THE INVENTION

A radiotelephone system divides a telephone service area into a plurality of cells, and establishes a radiotelephone link between a base station placed in such a cell and a mobile station (radiotelephone unit) located within that cell to make a call. As trends have been shifting from conventional voice-centric radiotelephone calls to data communication where data is transmitted over a telephone line, it is important to maintain and improve the quality of a communication link in order to secure high data speed and reliability. The quality of the communication link may be assessed by various measurements, for example, by measuring the field strength at a receiving point. By storing the measurement results and the positional information measured, the received field strength can be measured continuously.

However, a conventional apparatus cannot measure and store the data transmission rate in data communication, along with positional information. In data communication, the actual data transmission rate between the base station and mobile station is very important, and the accurate data at a measurement point is essential to the evaluation of the data communication link and the improvement in its quality.

SUMMARY OF THE INVENTION

Accordingly, the present invention provides a communication quality data gathering apparatus for measuring communication quality of a radiotelephone between a base station and a mobile station, the apparatus comprising: positional information detector for generating positional information for the communication quality data gathering apparatus; quality data detector for receiving a data signal transmitted from the base station to determine quality data representative of communication quality; computer for receiving the positional information and quality data to generate an association information therebetween; and memory for storing the positional information, quality data, and association information.

Additionally, a communication quality data gathering apparatus for measuring communication quality of a radiotelephone between a base station and a mobile station comprises: positional information detector for generating positional information for the communication quality data gathering apparatus, based on signals sent from a plurality of satellites orbiting around the earth; quality data detector for receiving a data signal per unit time transmitted from the base station to determine quality data representative of communication quality; computer for receiving the positional information and quality data to generate an association information therebetween; memory for storing the positional information, quality data, and association information; and a display device for displaying the positional information and quality data so that they have the association information therebetween.

Furthermore, the present invention provides a method for gathering quality data for a radiotelephone communication link between a base station and a mobile station, the method comprising the steps of: establishing a communication link between the base station and mobile station; receiving, by the mobile station, predetermined data transmitted from the base station; generating the quality data based on the data received; generating positional information indicative of a position where the mobile station is located; providing an association information between the quality data and positional information; and storing quality data and positional information associated.

The present invention also provides a method for gathering quality data for a radiotelephone communication link between a base station and a mobile station, the method comprising the steps of: establishing a communication link between the base station and mobile station; instructing, from the mobile station, the start of transmission of predetermined data stored in the base station, and receiving, by the mobile station, the predetermined data transmitted from the base station; gathering the predetermined data received per predetermined time to calculate a transmission rate per unit time and generate the quality data; calculating positional information indicative of a position where the mobile station is located, based on signals sent from a plurality of satellites orbiting from the earth; providing an association information between the quality data and positional information; storing the quality data and positional information associated; and displaying the quality data and positional information so that they have the association information therebetween.

The present invention also provides a method for gathering quality data for a radiotelephone communication link between a base station and a mobile station, the method comprising the steps of: establishing a communication link between the base station and mobile station; informing, to the base station, the start of transmission of predetermined data stored in the mobile station, and receiving, from the base station, a permission thereof; in response to receiving the permission, transmitting the predetermined data from the mobile station to the base station at a predetermined transmission rate; receiving, by the mobile station, a data receipt signal indicating that the base station has received the predetermined data; calculating positional information indicative of a position where the mobile station is located, based on signals sent from a plurality of satellites orbiting around the earth; providing an association information between the predetermined transmission rate and positional information; and storing the predetermined transmission rate and position information associated.

DESCRIPTION OF THE PREFERRED EMBODIMENT

Figure 1:
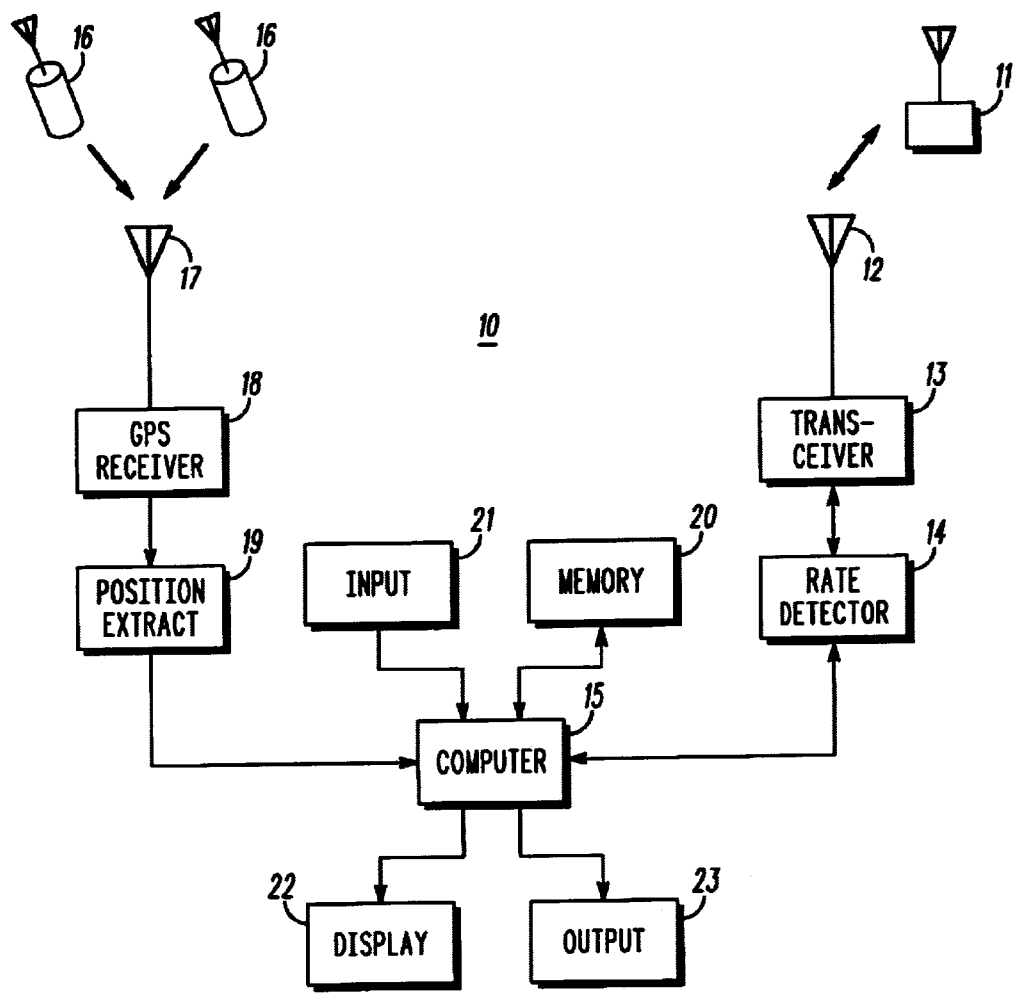
FIG. 1 is a block diagram for explaining the configuration of a data gathering apparatus according to the present invention.

FIG. 1 is a block diagram for explaining the configuration of a data gathering apparatus according to the present invention. The present invention relates to an apparatus for measuring signal transmission quality of a radiotelephone link established between a data gathering apparatus 10 and a base station 11 in a radiotelephone system. The radiotelephone system includes, for example, a CDMA system. The data gathering apparatus 10 has a system for sending and receiving transmission signals to and from the base station 11 via a radiotelephone link and a system for detecting the current position of the data gathering apparatus 10.

A signal transmitted from the base station 11 is received by an antenna 12 and fed to a telephone transceiver 13. The telephone transceiver 13 has transceiving capabilities corresponding to various radiotelephone systems to extract a desired transmission signal from the incoming received signal. The transmission signal extracted is sent to a transmission rate detector 14, where the transmission rate of the transmission signal is calculated. Generally, the transmission rate is represented as the number of bits transmitted per unit time, such as 28.8 kbit/sec or 56 kbit/sec (although the measurement results are not limited to those figures). The transmission rate detector 14 momentarily measures the transmission rate of the signal transmitted and sends the resulting measurements to a computer 15.

The data gathering apparatus 10 not only measures the transmission rate of the transmission signal transmitted from the base station 11 but also measures the current position of the data gathering apparatus 10 at a time when the transmission rate is calculated. Currently, as means that is simplest to detect the current position and capable of obtaining highly accurate information, the GPS (Global Positioning System) is utilized which executes positional calculation based on signals sent from a plurality of satellites orbiting around the earth. With the present invention, this system is also utilized to determine the current position. A signal sent from a satellite 16 is received by an antenna 17 and fed to a GPS receiver 18. The GPS receiver 18 is a unit that is commercially available, from which a position signal corresponding to positional information is sent to a positional information extractor 19. The positional information detected by the positional information extractor 19 is fed to the computer 15, where it is associated with the transmission rate already determined. Such association information may be implemented in any way; for example, the transmission rate and positional information may be completely merged, and stored as single data in a memory 20. Alternatively, the transmission rate and positional information may be assigned identifiers that provide association information therebetween, and then stored in the memory 20. In either case, it may be acceptable as far as corresponding positional information may be derived from the transmission rate.

To the computer 15 is connected an input unit 21, such as a keyboard or switch, to control the operation of the data gathering apparatus 10. Additionally, a display unit 22, such as a CRT or liquid crystal display, and an output unit 23 that comprises a printer for printout or a modem that sends a signal to another device, are also connected to the computer 15. Typically, the transmission rate and positional information are displayed on the display unit 22, and, if needed, presented together with map information stored in the memory 20. As the transmission rate is displayed over the map, a comparison can be made easily between points of good and bad transmission qualities; furthermore, if they are displayed in varying colors according to the values of transmission rates, testing and evaluation may be performed visually.

Although the configuration of the data gathering apparatus 10 has been described above, the data gathering apparatus 10 may also be combined with an existing apparatus.

For example, the transmission rate detector 14 and computer 15 may be substituted by a personal computer that is commercially available. That is, a portable telephone unit that corresponds to the antenna 12 and telephone transceiver 13 is connected to a personal computer via a modem. A communication software program contained in the personal computer is activated to establish a communication link with the base station 11 and receive predetermined data from the base station 11. The received signal is provided via the modem to the personal computer to allow its built-in program to calculate the transmission rate according to the data received for a predetermined time. A signal sent from the GPS receiver 18 is also received from the input port of the personal computer to determine the positional information from that signal and store it along with the transmission rate in a predetermined internal memory. The information determined is displayed on the display unit, and outputted as needed.

Figure 2:
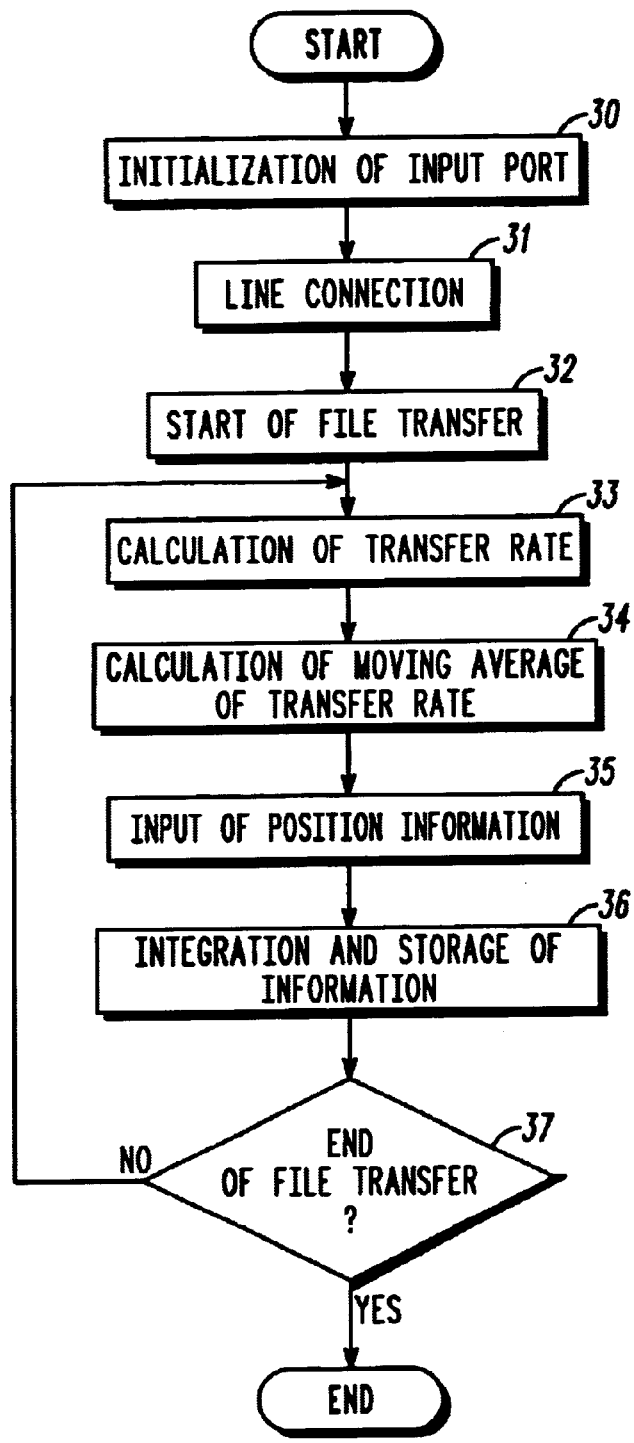
FIG. 2 shows processing steps according to the present invention, where predetermined data is received from a base station.

Next, processing steps of the present invention are described below. FIG. 2 shows processing steps where predetermined data is received from a base station. At block 30, the data input/output port is initialized. Once initialization is completed, the process proceeds to block 31, where a telephone link is established between the data gathering apparatus 10 and base station 11. Once the link has been established, communication can be initiated. At block 32, an instruction to start the transfer of predetermined data, which is prestored as a test data file in the base station 11, is sent to the base station. With the start of file transfer, the transmission rate detector 14 extracts the data sent from the base station 11 for a predetermined time to calculate a transmission rate therefrom, at block 33. The process proceeds to block 34, where as transmission rates are determined for a predetermined number of times, an average thereof is calculated to determine a moving average of transmission rates. In parallel with the calculation of transmission rates, the positional information sent from the GPS receiver 18 is inputted, at block 35. When the positional information and transmission rate are determined, the process proceeds to block 36, where the positional information and transmission rate are assigned a predetermined association information and then stored in the memory 20. Of course, the moving average data is also stored.

The base station 11 transfers a file of a predetermined length, and it is determined whether that file has been transmitted entirely, at block 37. If the transfer is in progress, the process loops back to block 33 to start at the calculation of the transmission rate. The above sequence of the steps is repeatedly executed, until the end of file transfer is detected at block 37. The above sequence does not include the step of displaying the calculated transmission rate and moving average on the display unit, although it may be readily appreciated by those of ordinary skill in the art that such a step may be included as appropriate. Those of ordinary skill in the art may also readily perform the step of displaying the transmission rate and moving average on the map, as well.

Figure 3:
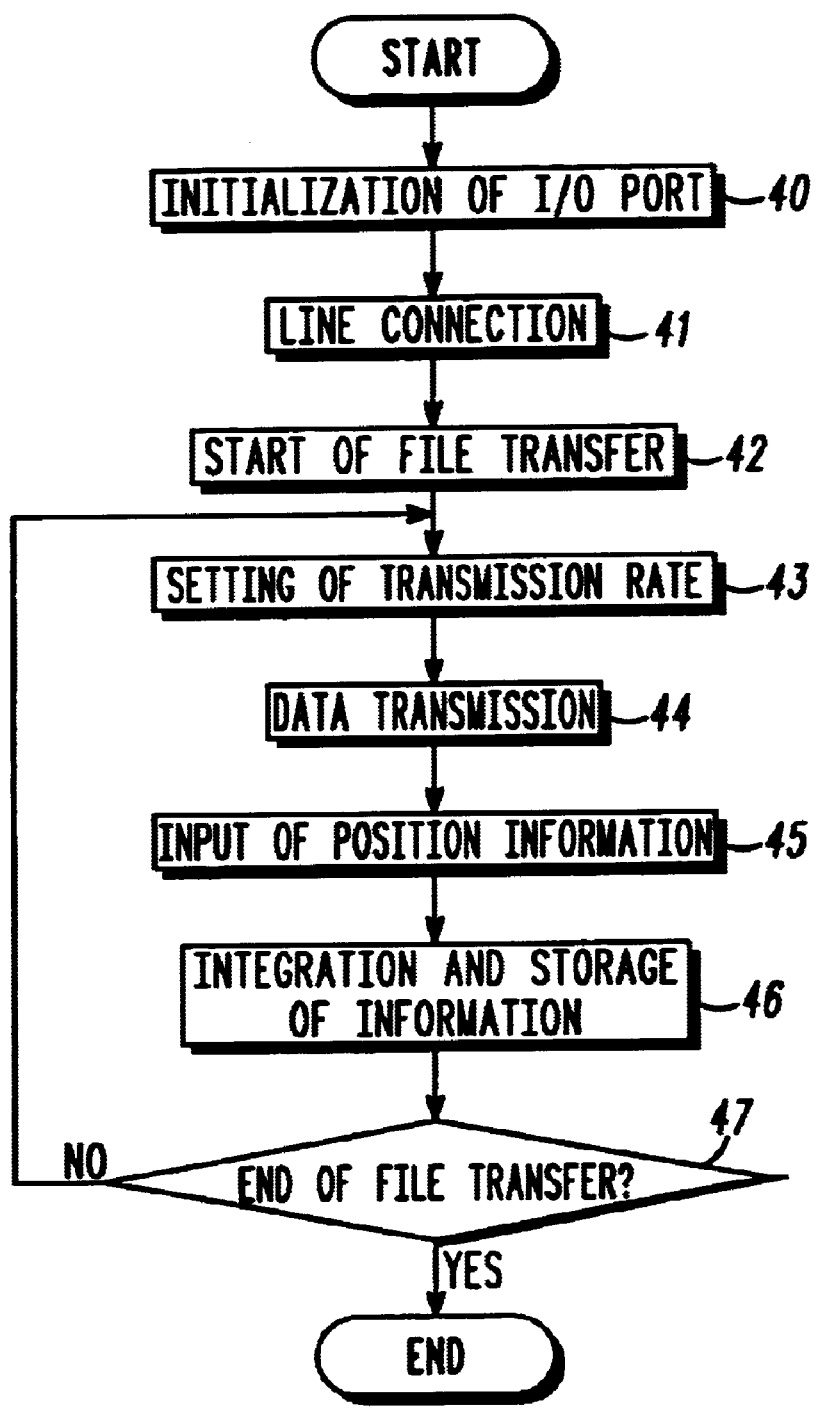
FIG. 3 shows processing steps according to the present invention, where predetermined data is transmitted from a mobile station to a base station.

Next, the process for measuring communication quality where data is transmitted from a mobile station to a base station is described with reference to the flowchart shown in FIG. 3. Port initialization and link establishment at blocks 40 and 41 are similarly performed as at blocks 30 and 31 in FIG. 2. At block 42, a request for permission of data transfer is made from the mobiles station, i.e., data gathering apparatus 10, to the base station 11, and upon receipt of the permission, file transfer is initiated. The process proceeds to block 42, where a data transmission rate is set, and data transmission is initiated at block 44. The base station 11 receives the data sent from the data gathering apparatus 10, and once its proper reception is acknowledged, it sends an acknowledgment signal to the data gathering apparatus 10. When the data gathering apparatus has received the acknowledgment signal, the process proceeds to block 45, where current position information is generated based on the positional information sent from the GPS receiver. The step of associating the positional information with the transmission rate is performed at block 46. The steps at blocks 45 and 46 are essentially similar to those at blocks 35 and 36 in FIG. 2.

As the transmission rate and positional information are stored in the memory 20, the process proceeds to block 47, where it is determined if a predetermined file has been transferred; if not, the process proceeds to block 43, where the above sequence of steps is repeated. In that case, the transmission rate is changed, and the maximum transmission rate is measured at that point. Once the file transfer has been done, a sequence of measurement steps is completed.

As described above, the apparatus and method for automatically measuring the communication quality between the base station and mobile station have been described. The data gathered is not only stored in a storage device but also displayed on a display unit, so that the communication quality can be evaluated while its measurements are made. By displaying or plotting the measurement results over the map drawn on the display unit, or changing their colors, the communication quality can be visually identified.

What is claimed is:

1. A communication quality data gathering apparatus for measuring communication quality of a radio communication between a base station and a mobile station, the apparatus comprising:

a positional information detector for generating positional information for the communication quality data gathering apparatus;

a quality data detector for receiving a data signal transmitted from the base station to determine quality data representative of the communication quality, the quality detector including a detector for detecting a transmission bit rate per unit time between the base station and the mobile station;

a computer for receiving the positional information and the quality data Lo generate an association information therebetween; and a memory for storing the positional information, the quality data, and the association information.

2. The communication quality data gathering apparatus according to claim 1, wherein the quality detector further includes a calculator for calculating an average for a predetermined Time based on the transmission bit rate.

3. The communication quality data gathering apparatus according to claim 1, wherein the positional information detector further generates the positional information based on signals sent from a plurality of satellites orbiting around the earth.

4. The communication quality data gathering apparatus according to claim 1, further comprising a display for displaying the quality data and the positional information so that they have the association information therebetween.

5. A communication quality data gathering apparatus for measuring communication quality of a radio communication between a base station and a mobile station, the apparatus comprising:

a positional information detector for generating positional information for the communication quality data gathering apparatus based on signals sent from a plurality of satellites orbiting around the earth;

a quality data detector for receiving a data signal per unit time transmitted from the base station to determine quality data representative of the communication quality;

a computer for receiving the positional information and the quality data to generate an association information therebetween;

a memory for storing the positional information, the quality data and the association information; and a display for displaying the positional information and the quality data so that they have the association information therebetween.

6. The communication quality data gathering apparatus according to claim 5, wherein the quality data detector further includes calculator for calculating an average for a predetermined time based on the transmission bit rate.

7. A method for gathering quality data for a radiotelephone communication link between a base station and a mobile station, the method comprising the steps of;

establishing a communication link between the base station and the mobile station;

instructing, by the mobile station, a transmission start of predetermined data stored in the base station:

receiving, by the mobile station, the predetermined data transmitted from the base station;

generating the quality data based on the data received;

generating positional information indicative of a position where the mobile station is located;

generating an association information between the quality data and the positional information; and storing the quality data and the positional information based on the association information.

8. The method for gathering quality data for a radiotelephone communication link according to claim 7, wherein the step of generating the quality data further includes the step of gathering the predetermined data per predetermined time to calculate a transmission bit rage per unit time.

9. The method for gathering quality data for a radiotelephone communication link according to claim 7, wherein the step of generating the quality data further includes the step of calculating an average for a predetermined time, based on the transmission bit rate.

10. The method for gathering quality data for a radiotelephone communication link according to claim 7, wherein the step of generating the positional information further includes the step of calculating the positional information based on signals sent from a plurality of satellites orbiting around the earth.

11. A method for gathering quality data for a radiotelephone communication link between a base station and a mobile station, the method comprising the steps of:

establishing a communication link between the base station and the mobile station;

receiving, by the mobile station, predetermined data transmitted from the base station;

generating the quality data based on the data received;

generating positional information indicative of a position where the mobile station is located;

generating an association information between the quality data and the positional information;

storing the quality data and the positional information based on the association information; and displaying the quality data and the positional information so that they have the association information therebetween.

12. A method for gathering quality data for a radiotelephone communication link between a base station and a mobile station, the method comprising the steps of:

establishing a communication link between the base station and the mobile station;

instructing, from the mobile station, the start of transmission of predetermined data stored in the base station;

receiving, by the mobile station, the predetermined data transmitted from the base station;

gathering the predetermined data received per predetermined time to calculate a transmission bit rate per unit time and generate the quality data;

calculating positional information indicative of a position where the mobile station is located, based on signals sent from a plurality of satellites orbiting around the earth;

providing an association information between the quality data and the positional information;

storing the quality data and the positional information based on the associated information; and displaying the quality data and the position information so that they have the association information therebetween.

13. The method for gathering quality data for a radiotelephone communication link according to claim 12, wherein the step of generating the quality data further includes the step of calculating an average for a predetermined time, based on the transmission bit rate.

14. A method for gathering quality data for a radiotelephone communication link between a base station and a mobile station, the method comprising the steps of establishing a communication link between the base station and the mobile station;

informing, to the base station, the start of transmission of predetermined data stored in the mobile station, receiving, from tile base station, an permission thereof;

in response to receiving the permission, transmitting the predetermined data from the mobile station to the base station at a predetermined transmission rate;

receiving, by the mobile station, a data receipt signal indicating that the base station has received the predetermined data;

calculating positional information indicative of a position where the mobile station is located, based on signals sent from a plurality of satellites orbiting around the earth;

providing an association information between the predetermined transmission rate and the positional information; and storing the predetermined transmission rate and the positional information associated.

15. The method for gathering quality data for a radiotelephone communication link according to claim 14, further comprising the step of repeating from the step of transmitting the predetermined data at a predetermined transmission rate to the step of storing the positional information.

16. The method for gathering quality data for a radiotelephone communication link according to claim 14, further comprising the step of displaying the transmission rate and the positional information at a time when the data receipt signal is received so that they have the association information therebetween.

* * * * *

UNITED STATES PATENT AND TRADEMARK OFFICE
CERTIFICATE OF CORRECTION

PATENT NO.    : 6,697,615 B1                                         Page 1 of 1
DATED         : February 24, 2004
INVENTOR(S)   : Daigo Takemura It is certified that error appears in the above-identified patent and that said Letters Patent is hereby corrected as shown below:

<u>Column 8,</u>
Line 6, after "from" delete "tile" and insert -- the --

Signed and Sealed this

Sixth Day of July, 2004

JON W. DUDAS
*Acting Director of the United States Patent and Trademark Office*